United States Patent [19]

Saarem et al.

[11] 4,191,166
[45] Mar. 4, 1980

[54] SOLAR HEAT SYSTEM

[75] Inventors: Myrl J. Saarem; Donald E. Lovelace; Dale C. Firebaugh; Dale F. Soukup, all of Carson City, Nev.

[73] Assignee: Richdel, Inc., Carson City, Nev.

[21] Appl. No.: 864,719

[22] Filed: Dec. 27, 1977

[51] Int. Cl.$^2$ .......................... F24J 3/02; F16K 31/44
[52] U.S. Cl. .................................. 126/430; 137/59; 137/625.46; 251/134
[58] Field of Search ............... 126/270, 271; 237/1 A; 137/59, 60, 61, 62, 625.46; 251/71, 133, 134; 417/32

[56] References Cited

U.S. PATENT DOCUMENTS

| | | | |
|---|---|---|---|
| 3,430,916 | 3/1969 | Raymond, Jr. | 251/71 |
| 3,986,489 | 10/1976 | Schlesinger | 126/270 |
| 4,044,754 | 8/1977 | Cronin | 126/271 |
| 4,109,639 | 8/1978 | Keegan | 126/271 |

Primary Examiner—James C. Yeung
Attorney, Agent, or Firm—Keith D. Beecher

[57] ABSTRACT

A domestic solar water heater system is provided which includes a collector, a storage tank, and a circulating pump. The system also includes a solid state electronic control module which automatically stops the circulating pump when the temperature of the water in the collector drops below the temperature of the water in the storage system, so that water is circulated through the system only when solar heat is available to heat the water to a temperature above the temperature of the water already stored in the storage tank. The system also includes a valve module which, upon a signal from the control module, causes the water to drain out of the collector when the temperature of the water in the collector falls to freezing temperatures so as to prevent damage to the collector. The control module also serves to stop the pump, to close the valve module, and to drain the collector when the temperature of the water in the storage tank reaches a predetermined maximum temperature.

7 Claims, 8 Drawing Figures

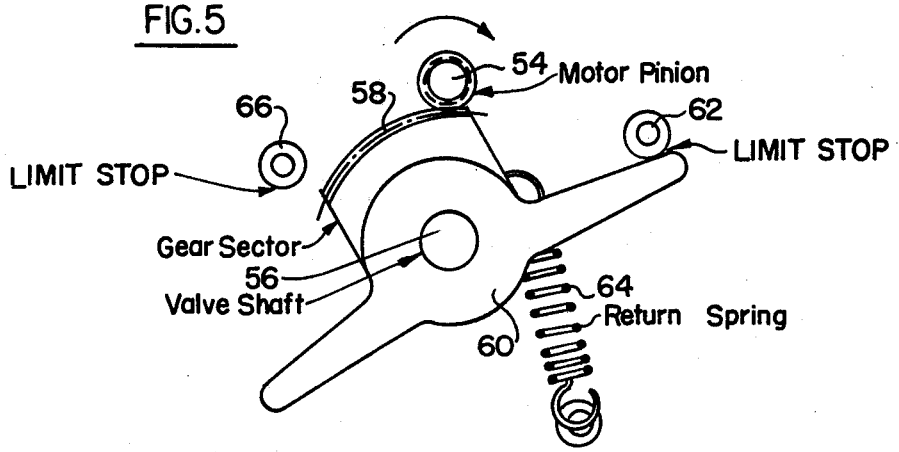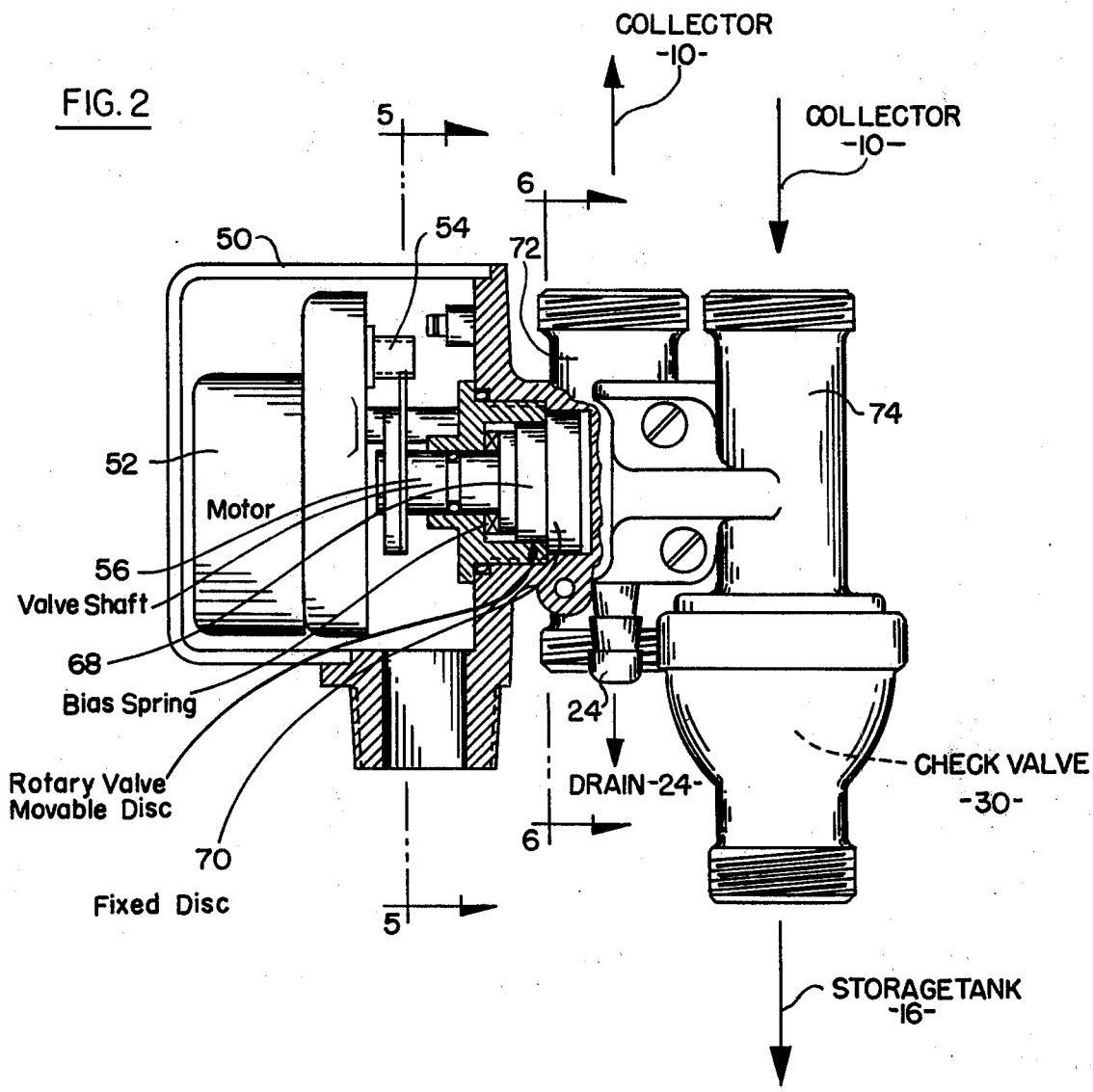

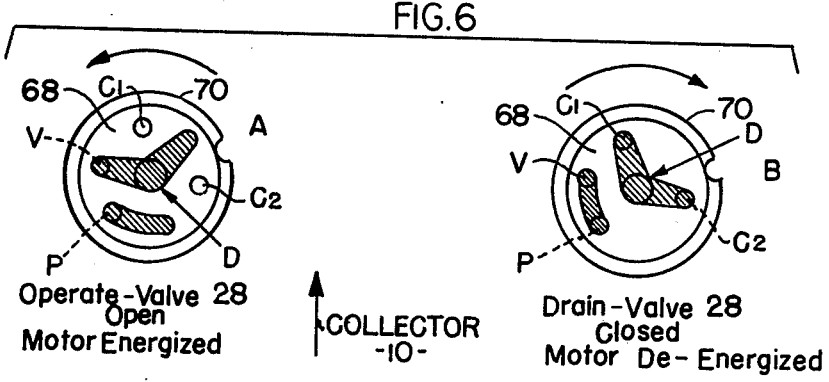
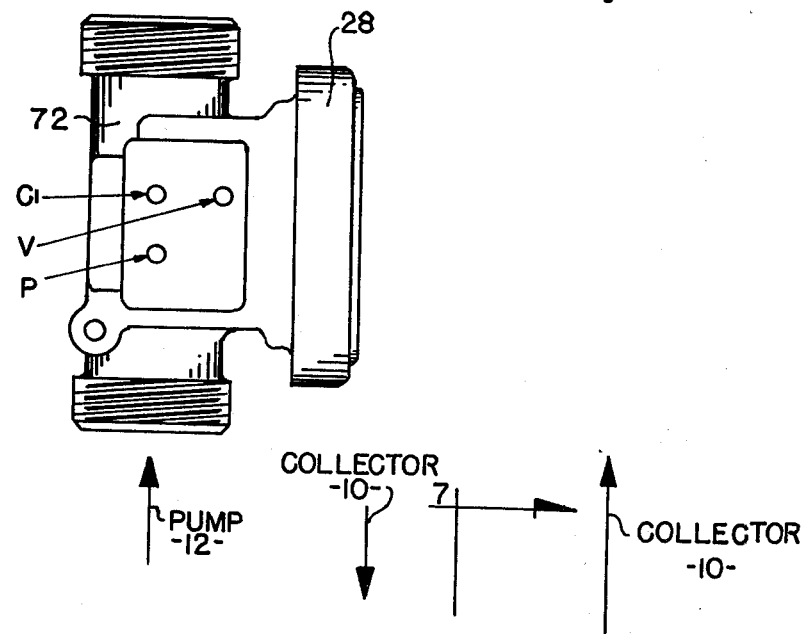
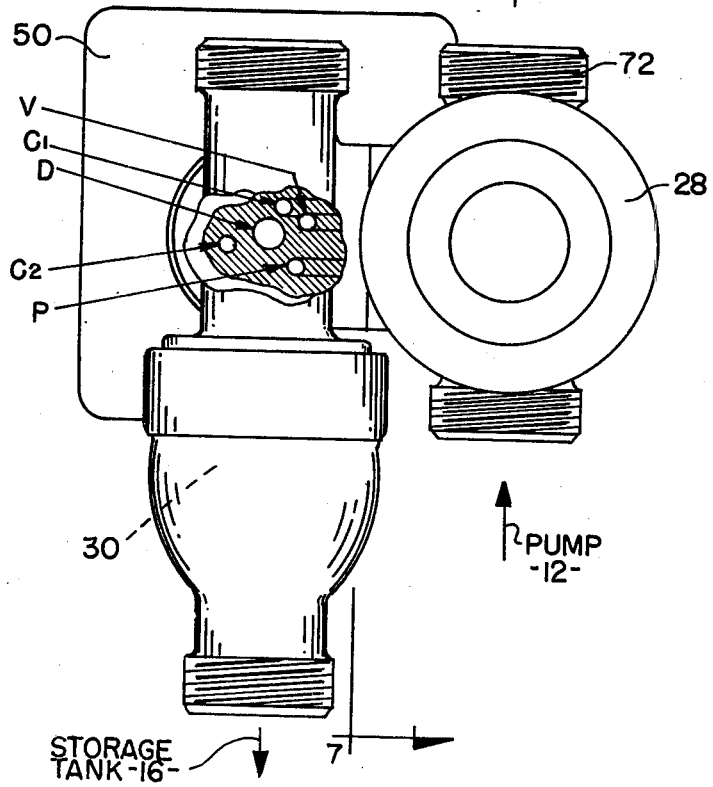

SOLAR HEAT SYSTEM

BACKGROUND OF THE INVENTION

Hot water for domestic purposes can be provided at low cost by a solar heater which usually comprises a storage tank, a solar heat collector, and a pump for circulating water through the collector from the storage tank and back to the storage tank. The heat collector usually takes the form of a flat plate of blackened metal, which is exposed to sunlight, and to which tubes are attached in any manner which provides good thermal contact. The tubes are connected to headers at each end of the collector plate. The collector is usually provided with a glass or a transparent plastic cover to trap the heat from the sun, and to reduce the heat loss to the atmosphere. The storage tank is connected to the collector by suitable pipelines, and water is circulated through the collector by an appropriate pump, thereby to provide hot water in the storage tank.

It is most desirable when the temperature of the water in the collector drops below the temperature of the water in the storage tank that the pump be de-energized to avoid circulating water into the storage tank which is cooler than the water already in the tank. This feature is provided by the control module of the system of the invention which senses when the collector temperature drops below the temperature of the contents of the storage tank to de-energize the pump motor, and which also senses when the temperature of the water in the collector is above the temperature of the water in the storage tank, so as to start-up the system.

It also is desirable that the collector be protected from the effects of freezing of the water contained therein. The valve module of the system of the invention responds to electrical commands from the control module to drain the water out of the collector should the temperature of the water in the collector approach freezing temperatures. The control module in the system of the invention also senses the temperature of the water in the storage tank, and shuts down the pump and drains the water out of the collector whenever the temperature of the water in the storage tank reaches a predetermined maximum level. The valve module is spring loaded, and the electrical connections are such that in the event of a power failure the valve module drains the collector.

BRIEF DESCRIPTION OF THE DRAWINGS

FIG. 2 is a side elevation of the valve module, partly in section;

FIG. 3 is another side elevational view of the valve module, partly in section, similar to the view of FIG. 2, but turned ninety degrees with respect to the view of FIG. 2;

FIG. 5 is a section of the module of FIG. 2 taken essentially along the line 5—5 of FIG. 2;

FIG. 6 is a section of the valve module of FIG. 2 taken essentially along the line 6—6 of FIG. 2;

FIG. 7 is a view of a portion of the valve module taken essentially along the line 7—7 of FIG. 3.

DETAILED DESCRIPTION

Figure 1:
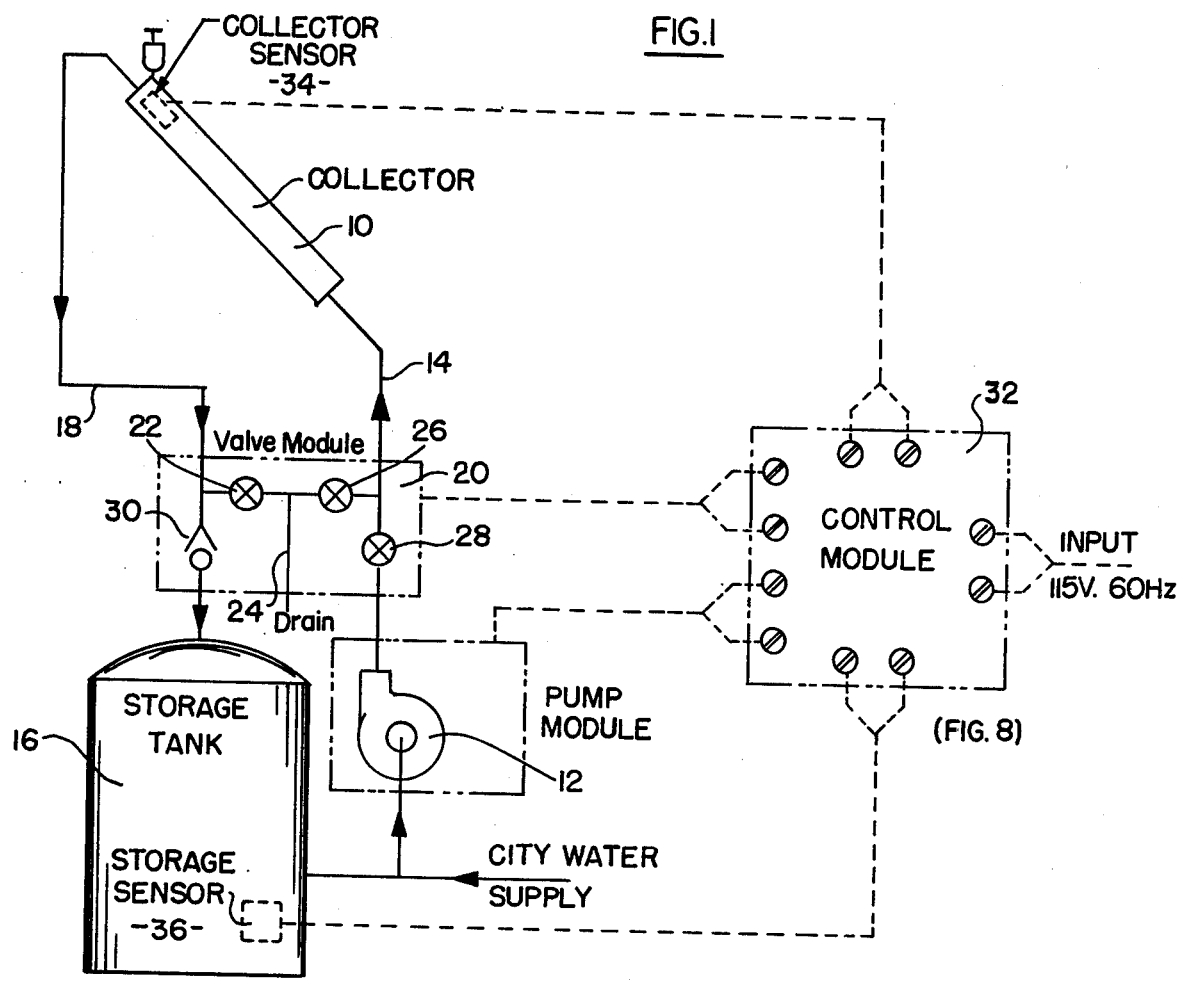
FIG. 1 is a schematic representation of a system constructed in accordance with one embodiment of the invention.

As stated above, the system of the present invention is represented schematically in FIG. 1. The system of FIG. 1 includes a solar collector 10 of known construction. A pump module 12 is connected to the collector 10 through a supply pipeline 14. The collector is connected back to a storage tank 16 through a return pipeline 18. During normal operation of the system, the pump 12 circulates water through the collector 10 and back to the storage tank 16. The collector 10 absorbs heat from the sun to raise the temperature of the water therein so that the heated water may be stored in the storage tank. Make-up city water may be supplied from time to time to the intake of pump 12.

A valve module 20 is interposed in the pipelines 14 and 18. The valve module includes a valve 22 which couples the return pipeline 18 to a drain line 24, and a valve 26 which couples the pipeline 14 to the drain line. The valve module also includes a valve 28 which is interposed in the pipeline 14, and a check valve 30 which is interposed in the pipeline 18. Details of the valve module are shown in FIGS. 3-7.

The system also includes a control module 32 which incorporates solid state circuitry which will be described in conjunction with FIG. 8. The control module 32 is connected to a temperature sensor 34 in collector 10, and to a temperature sensor 36 in storage tank 16. Sensors 34 and 36 may be any appropriate elements such as thermistors, whose electrical resistance varies widely as a function of temperature. The control module is energized from the usual 115 V, 60 Hz alternating current source. The control module is also connected to the valve module 20, and to the pump module 12.

During normal operation of the system, the control module 32 introduces an electric signal to the valve module 20, which causes valve 28 to open and valves 22 and 26 to close. The control module also introduces an energizing signal to pump module 12, to activate the pump. Therefore, during the normal operation, the pump is activated, and it serves to circulate water from the storage tank 16 through collector 10, and back to the storage tank.

When the collector sensor 34 and storage sensor 36 indicate that the temperature of the water in the collector is actually lower than the temperature of the water in the storage tank, the control module 32 de-energizes the pump in module 12, so that no further water circulates through the system, but the valve module remains energized so that the collector is not drained.

When an indication is received by the control module from the sensors 34 and 36, that the collector temperature is above the temperature of the water in the storage tank, the pump is again energized, so that circulation can again continue. In this way, the system is automatically controlled so that the water is circulated through the collector only when there is solar energy available to heat the water in the storage tank.

Should the temperature in the collector approach freezing temperatures, the control module responds to the sensor 34 to terminate the electric signal introduced in the valve module 20 and de-energize the valve module. An internal spring in the valve module then causes valve 28 to close, the valves 22 and 26 to open, so that all the water in the collector 10 may be drained out of the collector and connecting pipes. This action serves to obviate any damage which could otherwise occur should water freeze in the collector.

Also, when the water in the storage tank 16 rises to a pre-selected maximum temperature, the storage tank sensor 36 causes the control module 32 to de-energize the pump in module 12 so as to terminate the circulation of the water through the collector. Also, the sensor 36 causes the module to terminate the control signal to the valve module 20, so that the valve module is de-energized and, through the same action as described above, the water is drained out of the collector. Operation of the system is now terminated until the temperature of the water in the storage tank falls to an acceptable operating range.

The valve module 20 includes a housing 50, which, as shown in FIG. 2, encloses an electric motor 52. The drive shaft of the motor is coupled to a pinion 54 which, in turn, is coupled to a valve shaft 56 through a gear sector 58 (FIG. 5). A hub 60 is mounted on valve shaft 56. When an electric energizing signal is introduced to motor 52, the valve shaft 56 is turned through 60°, at which angular position, one of the arms of hub 60 engages a limit stop 62. This turning of the valve shaft is against the bias force of a return spring 64; and after the energizing signal has been removed, the return spring returns the shaft to its original position, at which another arm of hub 60 engages a limit stop 66. When the motor 52 is energized so as to turn the assembly of FIG. 5 to its illustrated position, the motor stalls, and it remains stalled until power is removed from the valve module. When the power is removed, and as stated above, the spring 64 returns the valve shaft 56 to its original angular position.

A rotary disc 68 with hydraulically connected passages (shown shaded) is mounted on the valve shaft 56, and the disc turns back and forth through 60° with respect to a fixed disc 70, as the motor 52 is energized and de-energized. As shown in FIG. 6, when the motor is energized, the disc 68 turns to couple a valve port V to the drain port D, and to close the ports C1 and C2 leading to collector pipes 14 and 18. Valve 28 may be a usual diaphragm valve including an actuating chamber. The valve is constructed so that when fluid pressure is relieved in the actuating chamber the valve opens, but when fluid pressure is introduced into the actuating chamber, the valve closes. Port V extends into the actuating chamber, so that when the discs 68 and 70 are in the position shown in FIG. 6A, valve 28 is open because its actuating chamber is vented to the drain line.

Fluid pressure is admitted to the shaft side of the rotary disc to provide a force reaction (equal to the product of the fluid pressure and the area of those ports connected to the drain line) to keep the discs in contact and thus prevent leakage between ports. There is also a force reaction (equal to the product of the fluid pressure and the cross sectional area of the valve shaft) in a direction tending to separate the discs. These forces are balanced by designing the port areas to be slightly larger than the valve shaft area, (so that at any pressure there is a net minimal force keeping the valve discs together), to assure sealing without large frictional effects that would impede free valve rotation. There is a bias spring to perform this function when there is little or no fluid pressure.

However, when the valve module is de-energized, spring 64 returns the assembly of FIG. 5 to the position shown in FIG. 6B. In this latter position, the ports C1 and C2 are coupled to the drain line, and the assembly of the plates 68 and 70 represent the valves 22 and 26, which are closed during normal operation of the system, and which are open when power is discontinued to the valve module, representing either a freezing condition in the collector 10, or a high temperature of the water in the storage tank 16, or a power outage, so as to drain the collector, as stated above.

Figure 4:
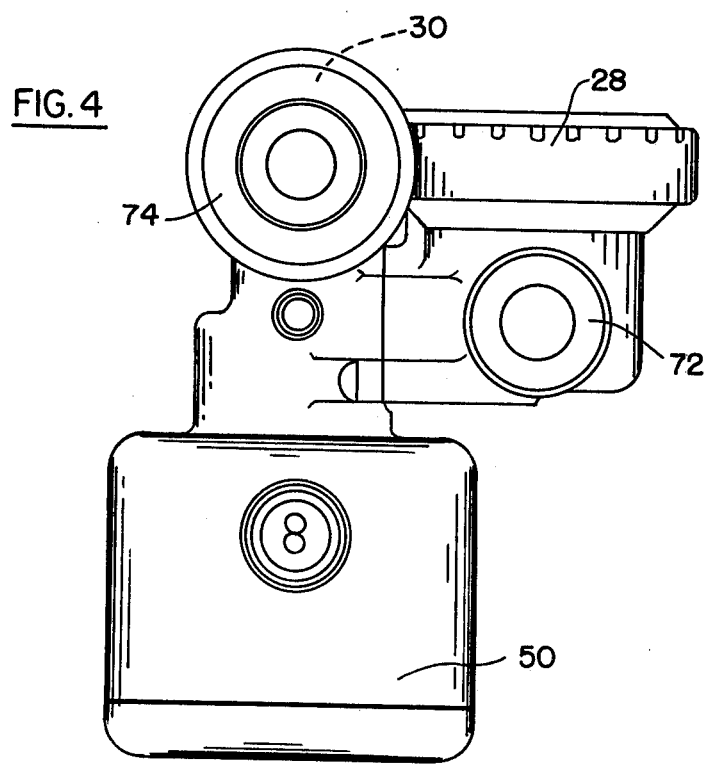
FIG. 4 is a bottom view of the valve module.

As shown in FIGS. 3 and 7, valve 28 is mounted in a pipe section 72, one end of the pipe section being coupled to the collector 10 through the pipeline 14, and the other end of the section being coupled to the pump 12. As shown in FIGS. 2 and 4, the valve module also includes a pipe section 74, one end of which is coupled to the collector 10 through the return pipeline 18, and the other end of which is coupled to the storage tank 16. The check valve 30 is contained in the lower end of pipe section 74, as shown in FIGS. 2 and 3.

During normal operation, the check valve 30 is opened by the flow of water down through the return pipeline 18 and through the valve module 20. However, when the water is drained out of the collector, the check valve 30 closes to block the port from the storage tank to the drain module. This is achieved by means of conventional check valve construction, which includes a movable member which is light enough to float on the water, so that when the pump is not re-circulating water through the system, the valve will rise and consequently check the port to reduce the effects of thermal siphoning. However, the movable member will be displaced from its seat and allow flow when the pump provides sufficient motive flow to overcome the valve buoyancy.

Figure 8:
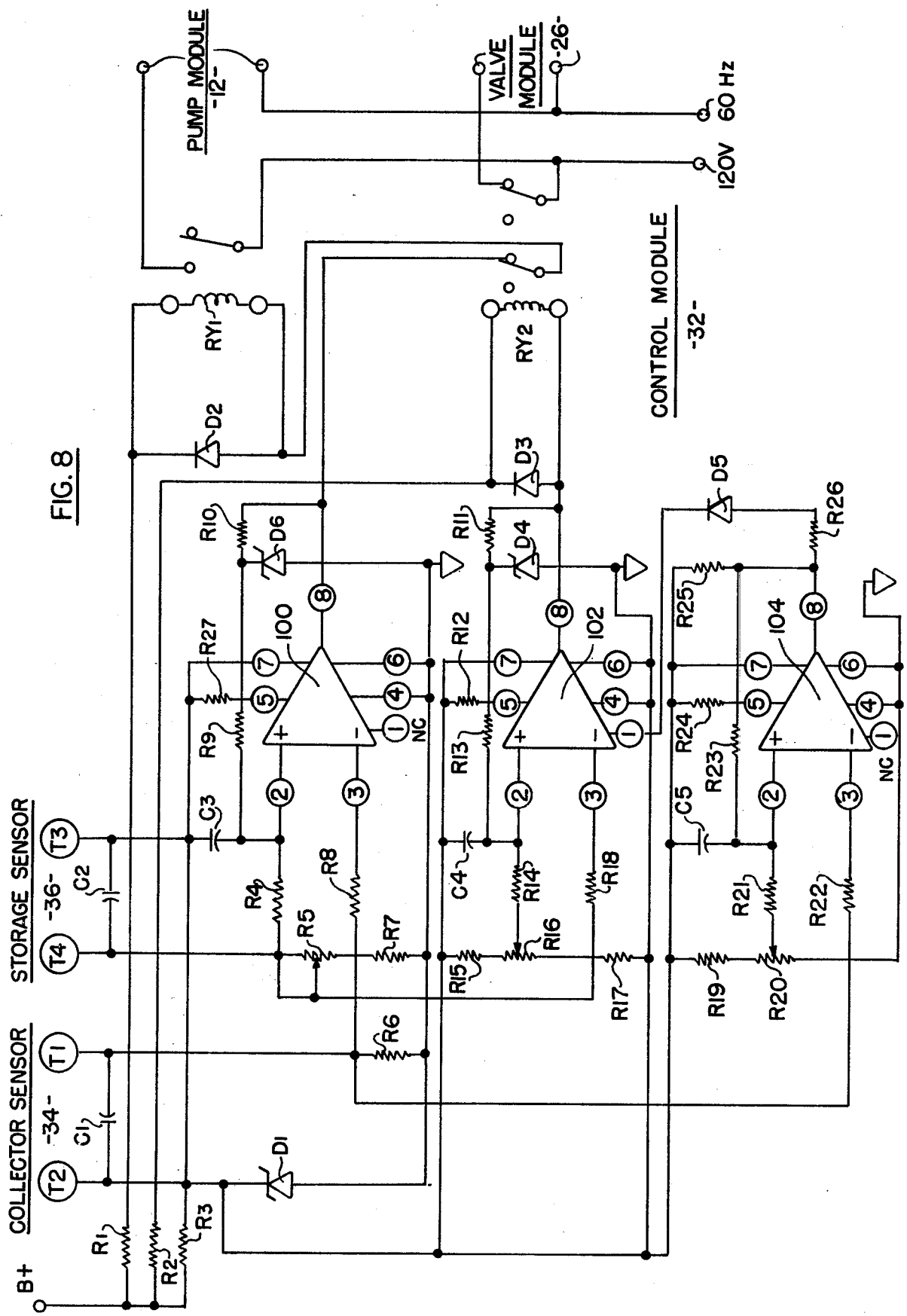
FIG. 8 is a circuit diagram of a control module included in the system of FIG. 1.

A solid state control circuit which may be included in the control module 32 is shown in FIG. 8. The control circuit of FIG. 8 includes three differential amplifiers designated 100, 102, and 104, each of which may be of the type designated CA3094T. The control circuit has a pair of input terminals T1 and T2 which are connected to the collector sensor 34, and which are shunted by a 0.1 microfarad capacitor C1. Terminal T1 is connected to a 2.7 kilo-ohm grounded resistor R6 and through a 10 kilo-ohm resistor R8 to pin 3 of differential amplifier 10. Terminal T2 is connected through a Zener diode D1 to ground, the Zener diode being of the type designated IN4734A.

The circuit of FIG. 8 also has input terminals T3 and T4 which are connected to the storage sensor 36, and which are shunted by a 0.1 microfarad capacitor C2. Terminal T4 is connected through a 500 ohm potentiometer R5 to a 3 kilo-ohm grounded resistor R7, and through a 10 kilo-ohm resistor R4 to pin 2 of differential amplifier 100. Pin 2 is also connected to a 0.1 microfarad capacitor C3 which, in turn, is connected to input terminal T3. Input terminal T3 is also connected to pin 5 through a 56 kilo-ohm resistor R27, and is connected directly to pin 7. Pins 4 and 6 are grounded. Pin 8 is connected to a 510 ohm resistor R10, which is connected through a 110 kilo-ohm resistor R9 to pin 2. The junction of the two resistors is connected to a grounded Zener diode D6 which may be of the type designated IN4734A. Input terminals T2 and T3 are connected to a positive terminal B+ of a source of unidirectional potential through a 330 ohm resistor R3.

Input terminal T4 is also connected through a 10 kilo-ohm resistor R18 to pin 3 of differential amplifier 102. Input terminal T2 is connected through a 680 ohm resistor R15 to a 500 ohm potentiometer R16, the potentiometer being connected to a 910 ohm grounded resistor R17. The movable arm of potentiometer R16 is connected to pin 2 of differential amplifier 102 through a 10 kilo-ohm resistor R14. Pin 2 is connected to the junction of a 430 kilo-ohm resistor R13 and a 0.1 microfarad capacitor C4. Resistor R13 is connected to a 510 ohm resistor R11 and to a grounded Zener diode D4. Diode D4 may be of the type designated IN4734A. Resistor R11 is connected to output pin 8 of differential amplifier 102.

Input terminal T1 is also connected through a 10 kilo-ohm resistor R22 to pin 3 of differential amplifier 104. Input terminal T2 is connected through a 1.8 kilo-ohm resistor R19 to a grounded 500 ohm potentiometer R20. The movable arm of potentiometer R20 is connected to pin 2 of differential amplifier 104 through a 10 kilo-ohm resistor R21. Pin 2 is also connected to the junction of a 0.1 microfarad capacitor C5 and a 910 kilo-ohm resistor R23. Capacitor C5 and resistor R19, together with a 56 kilo-ohm resistor R24, pin 7, and a 1.8 kilo-ohm resistor R25, are connected to resistor R3. Resistors R23 and R25 are connected to output pin 8, the output pin being connected through a 22 kilo-ohm resistor R26 and through a diode D5 to pin 1 of differential amplifier 102. Diode D5 may be of the type designated IN914. Pin 5 of differential amplifier 102 is connected through a 56 kilo-ohm resistor R12 to input terminal T2, and pin 7 is directly connected to the input terminal.

Pin 8 of differential amplifier 100 is connected through a pair of normally closed contacts of a relay RY2 to one terminal of a relay RY1. The other terminal of relay RY1 is connected to the positive terminal B+ through an 82 ohm resistor R1. The output pin 8 of differential amplifier 102 is conneced to one terminal of relay RY2, the other terminal of which is connected to the positive terminal B+ through an 82 ohm resistor R2. Relay RY1 has a pair of normally open contacts in the energizing circuit of pump module 12, and relay RY2 has a pair of normally closed contacts in the energizing circuit of valve module 26. Relay RY1 is shunted by a diode D2 and relay RY2 is shunted by a diode D3. Diodes D2 and D3 may be of the type designated IN4002.

In the operation of the circuit of FIG. 8, so long as the resistance of the storage sensor 36 is greater than the resistance of the collector sensor 34, indicating that the temperature of the water in the storage tank is less than the temperature of the water in the collector, differential amplifier 100 generates an output signal which passes through the normally closed contacts of relay RY2 to energize relay RY1 and, therefore, to energize pump module 12. Therefore, the pump module is activated and pumps water as long as the temperature of the water in the storage tank is below the temperature of the water in the collector. However, whenever the temperature of the water in the storage tank is equal or greater than the temperature of the water in the collector, the output of the differential amplifier 100 falls to zero, and relay RY1 becomes de-energized, to de-activate the pump module 12.

A constant positive voltage is established across the Zener diode D1 to which input terminal T2 is connected. Pin 2 of differential amplifier 102 is also established at a constant positive voltage, as determined by the setting of potentiometer R16. Pin 2 of differential amplifier 104 is also established at a predetermined positive voltage, as determined by the setting of potentiometer R20.

So long as the temperature of the water in the storage tank is below a predetermined maximum temperature, as established by the setting of potentiometer R16, the differential amplifier 102 will generate an output which will de-energize relay RY2. When relay RY2 is de-energized the valve module 26 is energized and held in a position in which water circulated through the collector 10 by the pump module 12. However, should the temperature of the water in the storage tank rise to a particular maximum value, the output of differential amplifier 102 will drop sufficiently so that relay RY2 will become energized. This action causes the valve module to be de-energized. Then, the spring control in the module, as described above, causes the valve module to open the collector 10 to the drain, so as to drain the collector.

Likewise, so long as the temperature of the sensor 34 is above a predetermined temperature, as established by the setting of potentiometer R20, differential amplifier 104 will generate an output which will allow differential amplifier 102 to function normally. However, when the temperature of the water in the collector drops below the predetermined value and, for example, approaches freezing temperature, the output of differential amplifier 104 will rise sufficiently so as to activate amplifier 102, thereby to cause relay RY2 to be energized and, again, to set the valve module to the position in which the contents of the collector are drained.

The feedback circuit of the differential amplifier 100 is different from that of differential amplifier 102. The output pin 8 of amplifier 100 is connected to the unregulated 17.3-volt direct voltage supply through the coil of a relay 4 with its shunted diode supressor D2. Now with an alternating current line change, or varying secondary voltage due to load changes, the voltage feedback by the feedback resistor R9 will also be changing which in turn will cause the operating point of the amplifier 100 to change. This causes the turn-on and turn-off points to vary and to be out of tolerance. However, the output circuit of amplifier 100 has another resistor R10 in series with the feedback resistor R9, and a Zener diode D6 is connected between the junction of these two resistors and ground.

Resistor R10 is a limiting resistor for the Zener diode D6 which assures that the Zener diode will regulate at 5.6 volts with AC line change and/or changes in load on the transformer secondary. Even with all these changes, a fixed voltage is fed back to pin 2 of amplifier 100 by resistor R9. This feedback voltage remains constant and thus, the trip points of amplifier 100 remain constant holding the 5° F. and 2° F. trip points to a very close tolerance even in the presence of 105 VAC to 125 VAC line changes, and to secondary transformer load changes from zero to 1.25 amperes.

The invention provides, therefore, an improved solar water heater system in which an electronic solid state control module controls a valve module and a pump module so that water is circulated through the system only under proper conditions, and so that the collector of the system is drained whenever conditions are such that damage could occur.

It will be appreciated that while a particular embodiment of the invention has been shown and described, modifications may be made. It is intended in the claims to cover the modifications which come within the spirit and scope of the invention.

What is claimed is:

1. In a solar water heater system which includes a collector, a storage tank, a circulating pump, and pipeline means intercoupling the collector, storage and circulating pump to enable the pump to circulate a fluid through the collector to be heated therein, and returned to the storage tank, said pipeline means including a supply line extending from the pump to the collector and a return line extending from the collector to the storage tank; the combination of: a drain line, an electrically energized valve module coupling the pipeline means to the drain line, and a control module connected to the valve module for selectively establishing the valve module in an energized operating condition in which a circulating path for the fluid is established from the pump through the collector to the storage tank, and for selectively establishing the valve module in a de-energized operating condition in which the fluid in the collector is discharged through the drain line; said valve module including electrically activated means for selectively establishing the valve module in its energized operating condition in response to an electric signal from the control module, and spring means for establishing the valve module in its de-energized operating condition in the absence of such electrical signal, and said valve module further including a first valve interposed in the supply line, said first valve being set to an open operating position by said electrically activated means when said valve module is in its energized operating condition, and said first valve being set to a closed operating position by said spring means when said valve module is in its de-energized operating condition, and said valve module including a pair of valves respectively coupling the supply line and the return line to the drain line, said pair of valves being set to a closed position by said electrically activated means when said valve module is in its energized operating condition, and said pair of valves being set to an open position by said spring means when said valve module is in its deenergized operating condition.

2. The combination defined in claim 1, in which said control module is also connected to said pump, and which includes a first sensor positioned in said collector and a second sensor positioned in said storage tank, and control circuitry in said control module connected to said sensors and to said pump to start the operation of the pump when the temperature of the fluid in the storage tank is less then the temperature of the fluid in the collector, and to stop the operation of the pump when the temperature of the fluid in the collector is less then the temperature of the fluid in the storage tank.

3. The combination defined in claim 2, and in which said control module includes circuitry connected to said first sensor in said collector and to the valve module to establish the valve module in its de-energized operating condition when the temperature of the fluid in the collector falls to a predetermined minimum level.

4. The combination defined in claim 2, in which said control module includes circuitry connected to the second sensor and to the pump and to the valve module for stopping the operation of the pump and for establishing the valve module in the de-energized operating condition when the temperature of the fluid in the storage tank reaches a predetermined maximum valve.

5. The combination defined in claim 1, in which said electrically activated means comprises an electric motor, and said pair of valves includes a rotary disc member mechanically coupled to the motor and to the spring means to be turned from a first to a second angular position when the motor is activated when said valve module is in its energized operating condition, and to be return the first angular position by the spring means when the motor is de-activated when said valve module is in its de-energized operating condition.

6. The combination defined in claim 5, in which said rotary disc member includes means coupling an actuating chamber of the first valve to the supply line when the rotary member is in its first angular position to cause the first valve to close when said valve module is in its de-energized operating condition, and said means coupling the actuating chamber of the first valve to the drain line when the rotary member is in its second angular position to cause the first valve to open when the valve module is in its energized operating condition.

7. The combination defined in claim 1, in which said valve module includes a check valve interposed in the return line.

* * * * *